INVENTOR.
Ralph Rodal

United States Patent Office 2,777,702
Patented Jan. 15, 1957

2,777,702

ROTATABLE FLUID CONVEYING CONNECTION WITH PRESSURE BALANCED SEALS

Ralph Rodal, Richmond, Ind., assignor to National Automatic Tool Company, Inc., Richmond, Ind., a corporation of Indiana Application March 29, 1951, Serial No. 218,130

6 Claims. (Cl. 279—20)

This invention relates to an apparatus for supplying a cooling and lubricating fluid to a rapidly rotating spindle.

When deep holes are drilled in metal, it is necessary in most cases to provide means for delivering a fluid cooling and lubricating medium under pressure to the cutting edge of the drill. It is advantageous to supply the lubricating fluid to the tip of the drill by means of an axial passage extending longitudinally through the drill from the shank. When the workpiece is revolved and the drill is held stationary, no problem is involved in connecting a fluid supply to the axial passage in the drill. However, it is often more advantageous to rotate the drilling tool and to hold the workpiece stationary. This is true in the case of workpieces which are difficult to rotate and also in the case of multiple simultaneous drilling, for example. When the drill is rotated it becomes necessary to provide a rotatable fluid conveying connection to the drill spindle.

There are a number of revolving fluid connecting arrangements which are satisfactory for low speed drilling. However, the introduction of improved drilling tools and new materials has greatly increased drilling speeds in some cases. For example, tungsten carbide tipped drills may be operated at very high drilling speeds in such metals as aluminum and magnesium. Increased drilling speeds have necessitated increasing the pressure of the coolant supplied to the drill in order to remove the increased volume of chips and to cool the drill adequately. Coolant pressures of 1,000 lbs. per square inch are not unusual. Convenient sealing arrangements have proved to be unserviceable for high speed drilling because high coolant pressures and the high speeds produce excessive frictional losses at the sliding bearing surfaces of the seals. In the conventional arangements the high pressure of the coolant imposes prohibitively great bearing loads on the interengaging sliding surfaces of the rotatable seals, considering the high surface speeds involved.

An object of this invention is to provide an apparatus for supplying a cooling and lubricating fluid at extremely high pressures to a rapidly revolving spindle.

A further object is to provide a rotatable fluid conveying connection which is operative throughout a very wide range of fluid pressures from twenty-five pounds per square inch or less to 1,000 lbs. per square inch or more, for example.

A further object is to provide a rotatable fluid connection which is operative at extremely great contact surface speeds, of 5,000 feet per minute, for example.

A further object is to provide a sealed rotatable fluid connection in which only nominal bearing loads are imposed upon bearing surfaces despite the use of extremely high fluid pressures.

A further object is to provide a sealed rotatable fluid conveying connection so constructed that the movable sealing parts are substantially in equilibrium with respect to the fluid pressure.

Further objects, advantages and features of the invention will become apparent from the following description of an illustrative embodiment, taken in connection with the drawings, in which.

Figure 1:
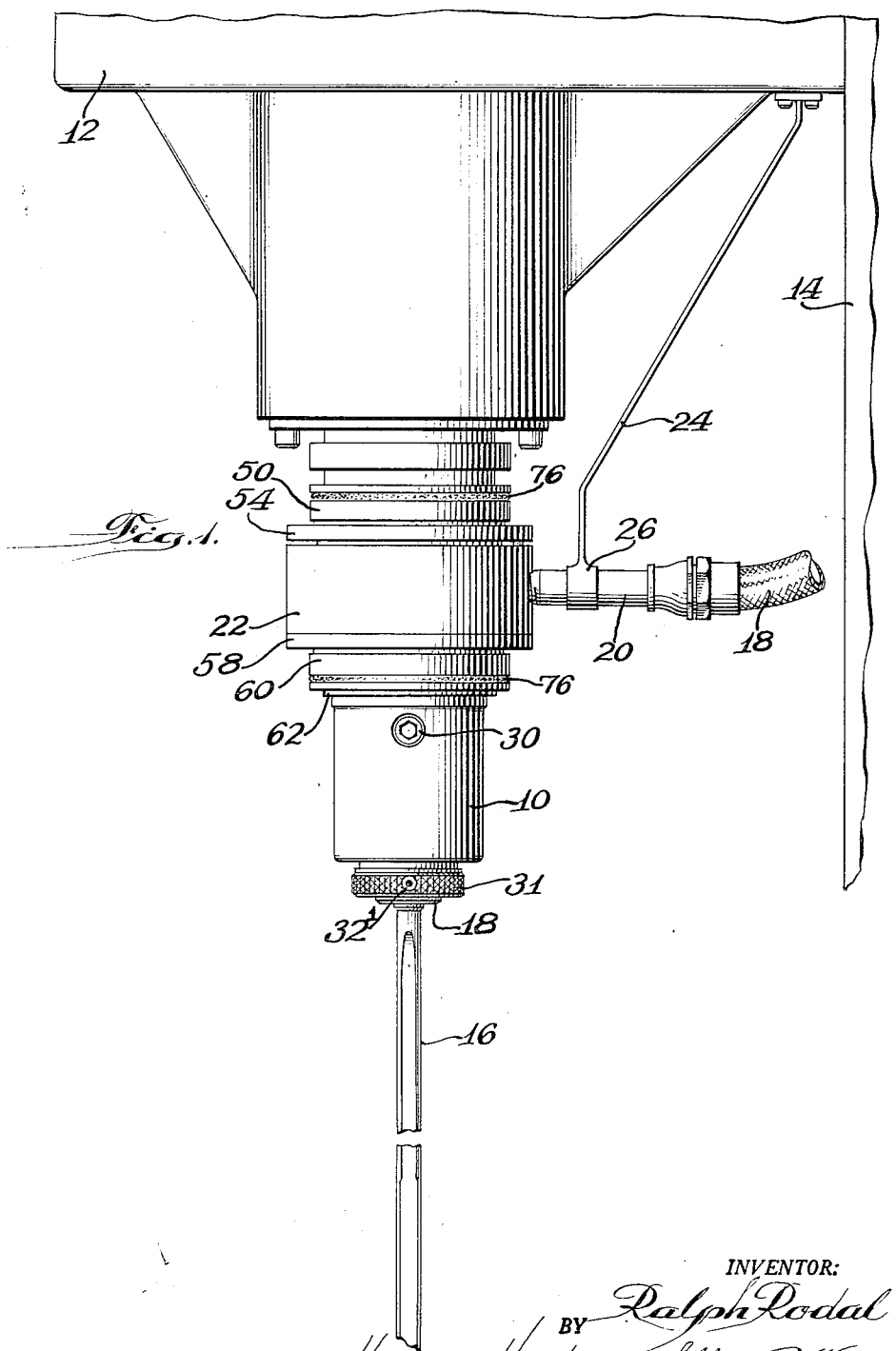
Fig. 1 illustrates a high speed spindle together with means constructed in accordance with the invention for supplying a lubricating and cooling fluid to the spindle.

In Fig. 1 a drill spindle 10 is rotatably carried by a carriage 12 which is movable forwardly and backwardly on a slideway 14. The carriage may be movable vertically as shown, or horizontally. A drill 16 is supported in the spindle by means of a drill holder 18. A cooling and lubricating fluid is supplied to the drill 16 by means of a hose 18 which is connected by means of a nipple 20 to a collar 22 forming a part of a rotatable sealed connection to the spindle 10. A brace 24 mounted on the carriage 12 supports a sleeve 26 positioned around the nipple 20, in order to hold the collar 22 and the hose 18 stationary as the drill spindle 10 rotates.

The drill 16 is illustrated as being of the single cutting lip style commonly known as a gun drill. However, the invention is equally applicable to spindles fitted with other types of drills such as twist drills or straight fluted drills having oil tubes.

Figure 2:
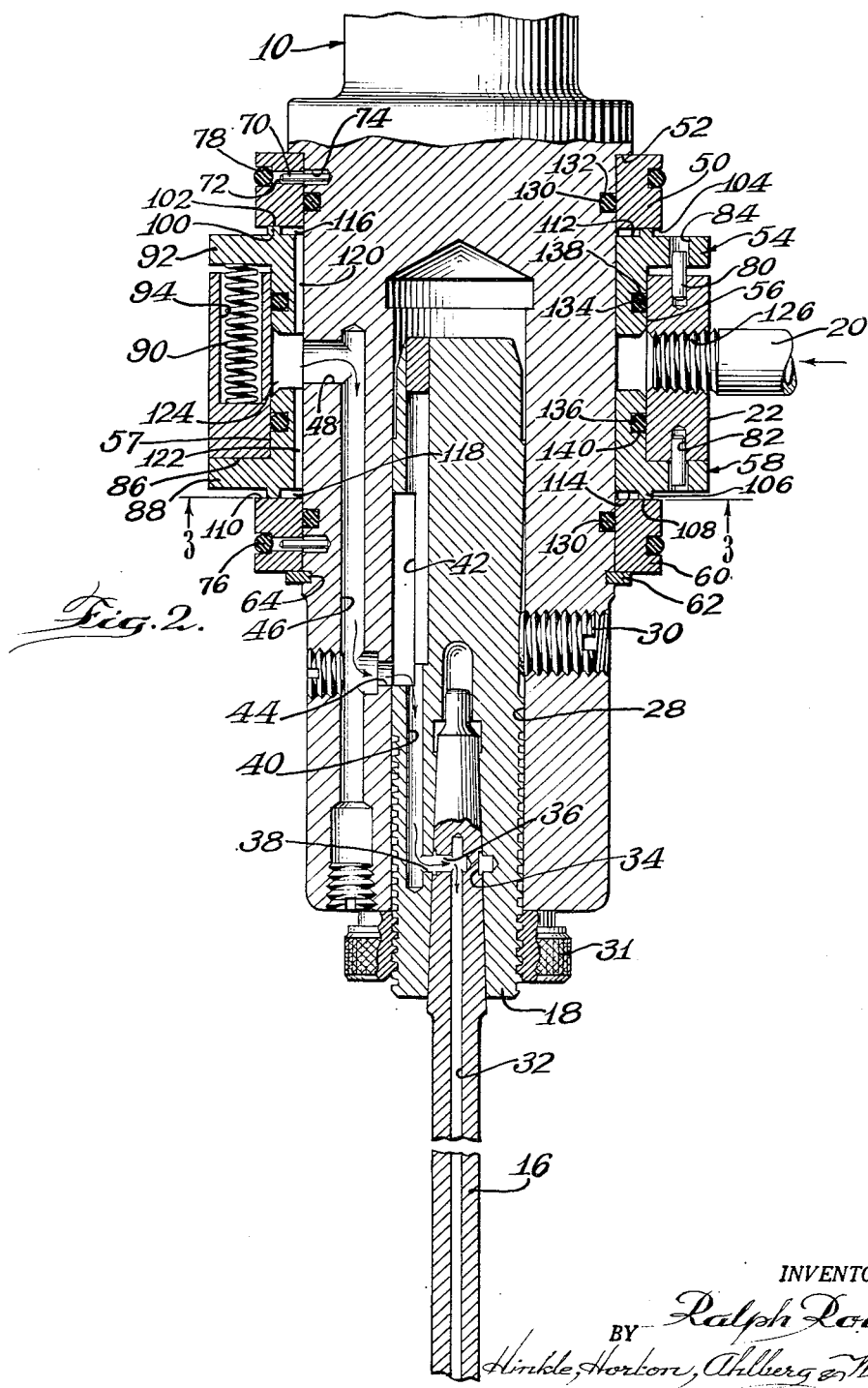
Fig. 2 is a central longitudinal cross-sectional view of the spindle and the rotatable coolant connection.

As shown in Fig. 2, the drill holder 18 is secured in a bore 28 in the nose of the spindle 10 by means of a set screw 30. A knurled nut 31 threaded on the outside of the tool holder 18 serves as a stop to determine the position of the tool holder in the bore 28. The nut 31 may be locked by means of a set screw 32' shown in Fig. 1.

The drill 16 is provided with an axial passageway or oil tube 32 extending to the tip of the drill. Lubricant is supplied to the oil tube 32 through an annular groove 34 in the shank of the drill. The groove 34 communicates with the oil tube 32 through a radial passageway 36.

Figure 3:
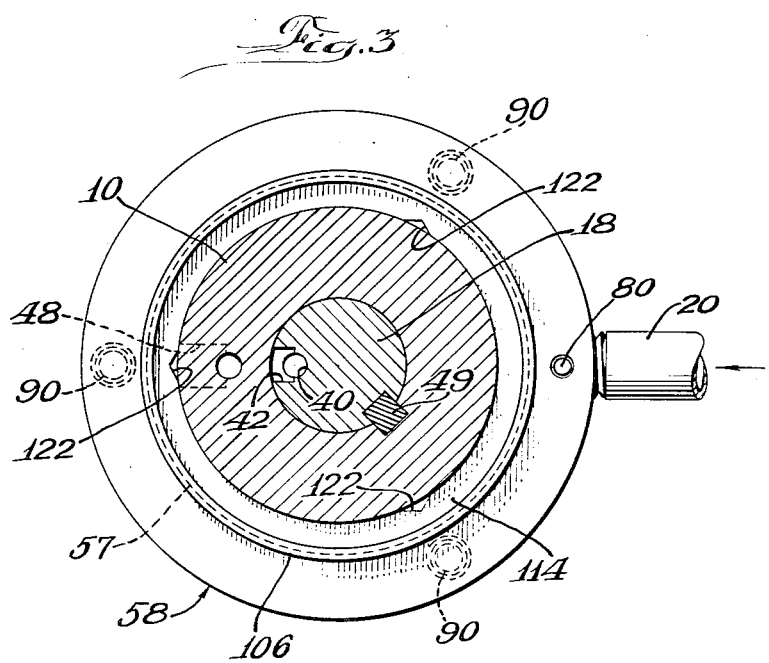
Fig. 3 is a transverse sectional view taken as indicated by the line 3—3 in Fig. 2.

The annular groove 34 in the drill registers with a port 38 which communicates with a longitudinal coolant passage 40 in the tool holder 18. The passageway 40 communicates with a longitudinal groove 42 in the periphery of the tool holder 18. The groove 42 registers with a port 44 which communicates with a longitudinal passageway 46 in the drill spindle 10. Coolant is supplied to the passageway 46 through a radial passageway 48 in the drill spindle. As shown in Fig. 3, the tool holder 18 is held against rotation with respect to the spindle by means of a key 49.

The means for supplying coolant to the spindle includes parts which are rotatable with the spindle and other parts which remain stationary. A shoulder is formed on the spindle by a ring 50, for example, which may be made of steel, carried by the spindle adjacent the carriage and abutting against an annular shoulder 52 on the spindle. An upper bearing sleeve 54 is positioned just below the steel ring 50 and has sliding contact therewith. The stationary collar 22 is slidingly fitted over a cylindrical outer surface 56 on the upper bearing sleeve 54. An outer cylindrical surface 57 of a lower bearing sleeve 58 is slidingly fitted inside the collar 22 below the upper sleeve 54. The lower bearing sleeve 58 is in sliding contact with a second ring 60 which rotates with the spindle and forms a second shoulder thereon. The second ring 60 may also be made of steel and the bearing sleeves 54 and 58 may be made of bronze. The second ring 60 is retained on the spindle by a snap ring 62 which seats in a groove 64 in the spindle.

In order to insure that the rings 50 and 60 will rotate with the spindle, a pair of radial pins 70 are provided which are loosely positioned in radial holes 72 in the rings and extend into radial holes 74 in the spindle. The pins are retained in position by means of resilient rings 76 seated in grooves 78 in the outer peripheries of the rings 50 and 60.

In order to insure that the upper and lower bearing sleeves 54 and 58 will remain stationary, two pins 80 are provided. The pins 80 are press-fitted into longitudinal holes 82 in the collar 22 and extend upwardly and downwardly into loosely fitting holes 84 in the upper and lower bearing sleeves 54 and 58. One of the pins extends from the upper horizontal surface of the collar 22, and the other from the lower surface.

The collar 22 has a flat lower surface 86 which is seated against a complementary upper surface on a flange 88 on the lower bearing sleeve 58. Resilient means is provided to urge the sleeves 54 and 58 and the rings 50 and 60 into sealing engagement. For example, a plurality of coil springs 90 may be compressed between the collar 22 and the lower surface of a flange 92 on the upper bearing sleeve 54. The springs 90 are loosely positioned in longitudinal bores 94 in the upper portion of the collar 22. Three equally spaced springs 90 may be provided (Fig. 3).

The springs 90, acting through the collar 22, push the lower bearing sleeve 58 downwardly against the ring 60, and the springs push the upper bearing sleeve 54 upwardly against the upper ring 50.

The upper bearing sleeve 54 has an upwardly extending annular ridge 100 which preferably has a flat lapped upper surface 102 which engages a flat lapped lower surface 104 on the ring 50 to form a seal. The lower bearing sleeve 58 has a similar downwardly extending annular ridge 106 having a flat lapped lower surface 108 engaging a flat lapped upper surface 110 on the ring 60. The upper and lower bearing sleeves 54 and 58 have flat annular surfaces 112 and 114, respectively, positioned radially inwardly from the ridges 100 and 106. The surfaces 112 and 114, together with the ridges 100 and 106, and the rings 50 and 60, define annular cavities 116 and 118, respectively. Coolant is admitted to the cavities 116 and 118 through passage means which may comprise a plurality of longitudinal grooves 120 and 122 on the inner periphery of the bearing sleeves 54 and 58. There may be three of the grooves 120 in each of the bearing sleeves, and the grooves may be V-shaped in cross-section as shown in Fig. 3.

The bearing sleeves 54 and 58 are spaced apart by the collar 22 to form an annular cavity 124 between the sleeves. The cavity 124 registers with an opening 126 in the collar 22, the inlet nipple 20 being threaded into the opening 126. The longitudinal grooves 120 in the sleeves also communicate with the cavity 124. The cavity 124 also registers with the radial passage 48 in the spindle 10.

Leakage of lubricant between the rings 50 and 60 and the spindle 10 is prevented by O-shaped packing rings 130 compressed between the rings and the spindle and positioned in grooves 132 in the spindle. Similar O-shaped packing rings 134 and 136, positioned in grooves 138 and 140 in the bearing sleeves 54 and 58, are compressed between the collar 22 and the bearing sleeves to prevent leakage of lubricant therebetween.

In the operation of the apparatus illustrated in the drawings, the spindle 10 is rapidly rotated by means in the carriage 12. The collar 22 is held stationary by the brace 24. A lubricating and cooling fluid is forced under pressure through the nipple 20 from the hose 18. The lubricant passes into the longitudinal oil hole 32 in the drill 16 through the annular cavity 124 between the bearing sleeves, the radial passage 48 in the spindle, the longitudinal passage 46, the port 44, the groove 42 in the tool holder 18, the longitudinal passage 40, the port 38, the annular groove 34 in the drill, and the radial passage 36. The lubricant is also forced through the V-shaped grooves 120 and 122 into the annular cavities 116 and 118. A small amount of the lubricant leaks between the rings 50 and 60 and the bearing sleeves 54 and 58 because of unavoidable imperfections in the flat lapped surfaces 104 and 110 on the rings, and 102 and 108 on the sleeves. This slight leakage is not objectionable, and in fact it serves to lubricate the sliding surfaces.

According to one of the features of this invention the rotatable coolant conveying connection, and particularly the bearing sleeves 54 and 58, are so constructed that the pressure of the cooling and lubricating fluid does not cause excessive contacting pressures between the flat lapped surfaces on the rings 50 and 60 and the bearing sleeves 54 and 58. In fact the bearing sleeves may be so constructed that they are in equilibrium with respect to the pressure of the lubricant so that the forces urging the sleeves 54 and 58 against the rings 50 and 60 are due entirely to the springs 90. In the interest of simplicity the ensuing description will be directed particularly to the lower bearing sleeve 58, but of course the description is equally applicable to the upper bearing sleeve.

Figure 4:
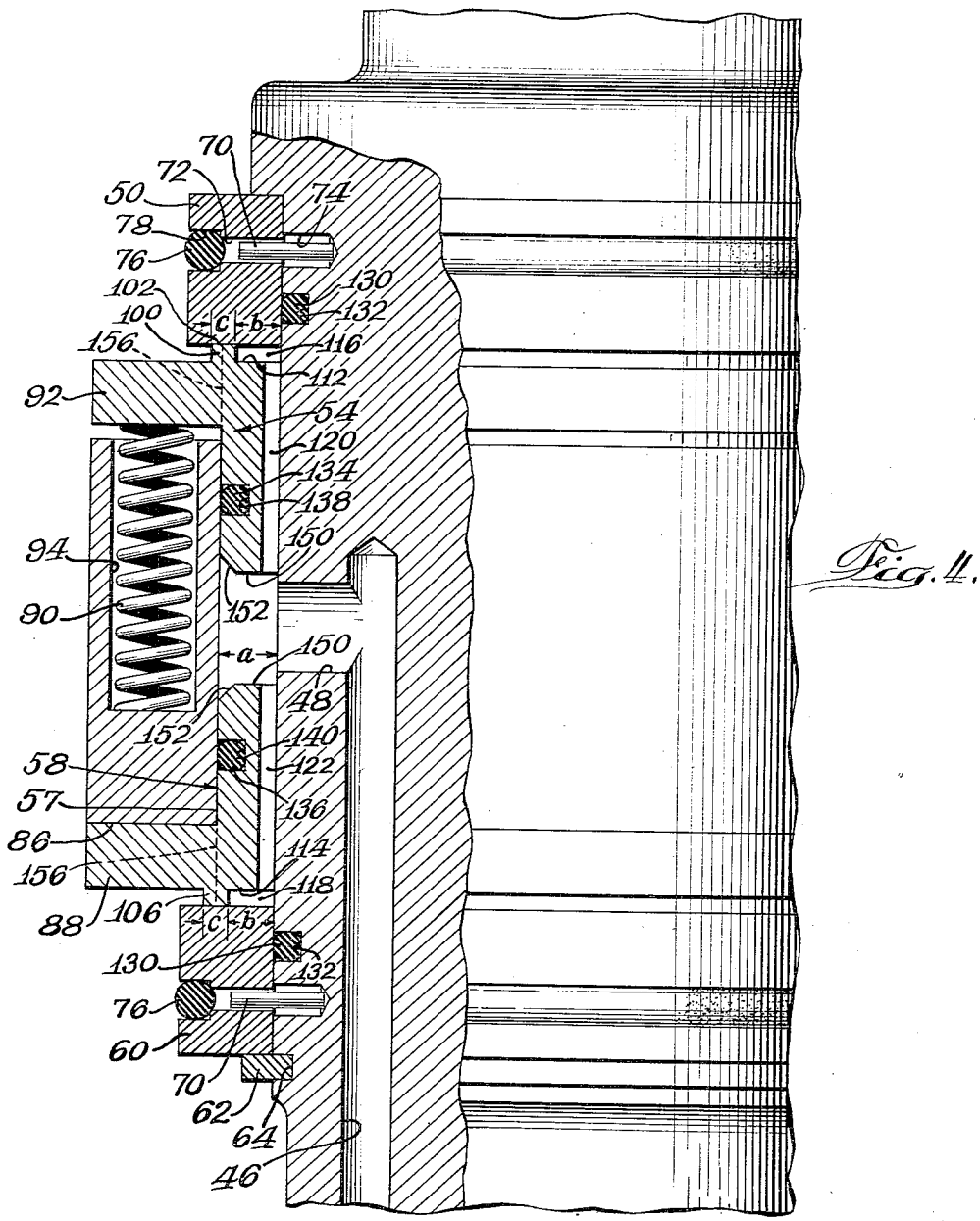
Fig. 4 is an enlarged fragmentary longitudinal view of the rotatable fluid carrying connection, the view being partly in section.

As shown in Fig. 4 the lower bearing sleeve 58 has a flat upper face 150 having a chamfered outer corner 152. The projected radial width of this surface may be designated as $a$, as indicated in Fig. 4. Consequently the lubricant exerts a downward longitudinal force on the surface 150 which is proportional to the width $a$. The flat surface 114 on the sleeve, positioned inside the ridge 106, has a radial width $b$ as indicated. Consequently the lubricant exerts an upward longitudinal force on this surface which is proportional to $b$. The force on the surface 114 tends to neutralize the force on the surface 150 and thereby to relieve the interengaging surfaces 110 and 108 of any force due to the lubricant pressure.

Because of the previously mentioned leakage between the surfaces 108 and 110, the lubricant also exerts an upward longitudinal force on the surface 108 on the ridge 106. The width of the ridge may be designated $c$ as indicated. The full pressure of the lubricant is present at the inner edge of the surface 108 but the pressure due to the lubricant is zero at the outer edge. Thus the average pressure on the surface 108 is approximately one-half of the full pressure of the lubricant. Thus the upward force on the surface 108 is approximately proportional to one-half $c$. Consequently the bearing sleeve 58 is approximately in equilibrium with respect to the lubricant pressure when $b + \frac{1}{2}c = a$. This relationship exists in the embodiment illustrated since the outer cylindrical surface 57 of the sleeve 58 is aligned with the center line of the ridge 106. The center line is indicated in the drawing at 156 to emphasize this constructional feature. The dimensions $a$, $b$ and $c$ may be varied somewhat so that some force is applied between the interengaging surfaces 108 and 110 due to the lubricant pressure if desired. On the other hand the dimension $a$ may be made slightly less than $b + \frac{1}{2}c$ so that the lubricant pressure tends to relieve some of the force between the surfaces 108 and 110 due to the springs 90.

The embodiment illustrated may be modified by positioning the ridges 100 and 106 on the rings 50 and 60 rather than on the sleeves 54 and 58.

It will be apparent that in an apparatus according to this invention the forces between interengaging sealing surfaces in the rotatable lubricant connection are kept down to nominal values to avoid excessive friction with attendant generation of excessive heat. Thus a rotatable coolant connection, according to the invention, will stand up under an indefinite period of service despite the use of extremely high spindle speeds and extremely high coolant pressures.

Many of the details of the embodiment described above are merely illustrative and should not be taken as limitative. The invention may be practiced by resorting to many modified but equivalent arrangements. The true scope of the invention is indicated by the following claims.

I claim:

1. A rotatable connection to supply a fluid lubricant under pressure to a rapidly rotatable spindle, comprising means on the spindle forming an annular shoulder facing longitudinally outwardly, a first bearing sleeve around the spindle positioned adjacent the shoulder, a second bearing sleeve around the spindle spaced longitudinally from the first bearing sleeve, a collar positioned around the bearing sleeves, means on the spindle forming a second annular shoulder facing longitudinally inwardly adjacent the second bearing sleeve, means restraining the assembly of both bearing sleeves and the collar against rotation during rotation of the spindle, first and second respective annular ridges on the bearing sleeves having bearing faces engaging the respective shoulders, the ridges being spaced radially outwardly from the spindle, resilient means to urge the respective ridges and shoulders into sealing engagement, an inlet extending through the collar to supply lubricant between the sleeves to provide lubricant pressure forces on the sleeves tending to urge them against the respective shoulders, and passage means to supply lubricant between the respective shoulders and the sleeves to provide lubricant pressure forces to counterbalance the first mentioned forces, the area of each sleeve end facing the adjacent sleeve being substantially equal to the area of the opposite end of the sleeve between the ridge and the spindle plus one-half the area of the ridge face engaging the annular spindle shoulder.

2. A rotatable connection to supply a fluid lubricant under pressure to a rapidly rotatable spindle, the lubricant being carried to the tip of a drill mounted in the spindle through a passage in the drill, comprising a ring on the spindle providing a flat annular shoulder facing longitudinally outwardly, a first bearing sleeve around the spindle positioned adjacent the shoulder, a second bearing sleeve around the spindle spaced longitudinally from the first bearing sleeve, a collar positioned around the bearing sleeves, a second ring on the spindle providing a second flat annular shoulder facing longitudinally inwardly adjacent the second bearing sleeve, means restraining the assembly of the first and second bearing sleeves and the collar against rotation during rotation of the spindle, first and second respective annular ridges on the first and second bearing sleeves having flat faces for engaging the respective rings, the ridges being spaced radially outwardly from the spindle, respective first end surfaces on the sleeves between the ridges and the spindle, spring means carried by the collar to urge the ridges on the sleeves into sealing engagement with the respective rings, respective confronting said second end surfaces on the sleeves facing away from the respective rings, an inlet extending through the collar to supply lubricant between the sleeves to provide first lubricant pressure forces on the second end surfaces of the sleeves tending to urge them against the respective shoulders, and a pair of passage means to supply lubricant between the respective shoulders and the sleeves to provide lubricant pressure forces on the first end surfaces and the faces of the ridges for counterbalancing the first mentioned forces, the area of the respective second end surfaces being approximately equal to the sum of the area of the respective first end surfaces plus one-half the area of the respective ridge faces.

3. In a rotatable connection to supply a fluid lubricant under pressure to a rapidly rotatable spindle, means on the spindle forming an annular shoulder, a bearing sleeve around the spindle adjacent the shoulder and restrained against rotation, an annular ridge spaced radially outwardly on the bearing sleeve from the spindle having a face for sealing engagement with the shoulder, a first end surface on the sleeve facing away from the shoulder, a second end surface on the sleeve between the ridge and the spindle, resilient means urging the shoulder and the sleeve into sealing engagement, passage means to supply lubricant to the first end surface to provide lubricant pressure forces on the sleeve tending to urge it against the shoulder, and additional passage means to supply lubricant to the second end surface and the face of the ridge to provide lubricant pressure forces on the sleeve for counterbalancing the first mentioned forces, the area of the first end surface being approximately equal to the sum of the area of the second end surface plus one-half the area of the face of the ridge.

4. Means for making a substantially sealed high pressure fluid carrying connection between two relatively rotating parts, comprising means forming a pair of spaced shoulders on one of the parts to form opposed annular bearing surfaces, a pair of spaced sleeves positioned between the shoulders, means to prevent relative rotation between the sleeves and the other of the relatively rotating parts, said sleeves having flat-faced annular ridges respectively bearing on the opposed annular bearing surfaces and being freely movable toward their respective bearing surfaces, the area of contact between each of the ridges and its bearing surface being substantially twice that of the net area of the sleeve which is subjected to fluid pressure in a direction to force the sleeve toward its bearing surface, and means forming fluid conducting passageways to and from the space between the sleeves.

5. Means for making a substantially sealed high pressure fluid carrying connection between two relatively rotating parts, comprising means forming a pair of spaced shoulders on one of the parts to form opposed annular bearing surfaces, a pair of spaced sleeves positioned between the shoulders, means to prevent relative rotation between the sleeves and the other of the relatively rotating parts, said sleeves having flat-faced annular ridges respectively bearing on the opposed annular bearing surfaces and being freely movable toward their respective bearings surfaces, the area of contact between each of the ridges and its bearing surface being substantially twice that of the effective net area of the sleeve which is subjected to fluid pressure in a direction to force the sleeve toward its bearing surface, means forming fluid conducting passageways to and from the space between the sleeves, and resilient means for forcing the sleeves toward their respective bearing surfaces.

6. Means for making a substantially sealed high pressure fluid carrying connection between two relatively rotating parts, comprising means forming a pair of spaced opposed annular shoulders on one of the parts, a pair of spaced sleeves positioned between the shoulders and freely movable toward the respective shoulders, means to prevent relative rotation between the sleeves and the other of the relatively rotating parts, a pair of flat-faced annular ridges respectively positioned between the sleeves and the shoulders on one of them and bearing on the other, the bearing area of each of the ridges being substantially twice that of the net area of the sleeve which is subjected to fluid pressure in a direction to force the sleeve toward its shoulder, and means forming passageways to and from the space between the sleeves.

References Cited in the file of this patent

UNITED STATES PATENTS

| | | |
|---|---|---|
| 2,010,930 | Rowe | Aug. 13, 1935 |
| 2,215,034 | Gorman | Sept. 17, 1940 |
| 2,393,835 | Stevenson | Jan. 29, 1946 |
| 2,447,663 | Payne | Aug. 24, 1948 |